Sept. 18, 1934.  G. A. SALZGEBER  1,973,728
COMPASS
Original Filed Jan. 3, 1929    2 Sheets-Sheet 1

Inventor.
Gustave A. Salzgeber
by Heard Smith & Tennant.
Attys.

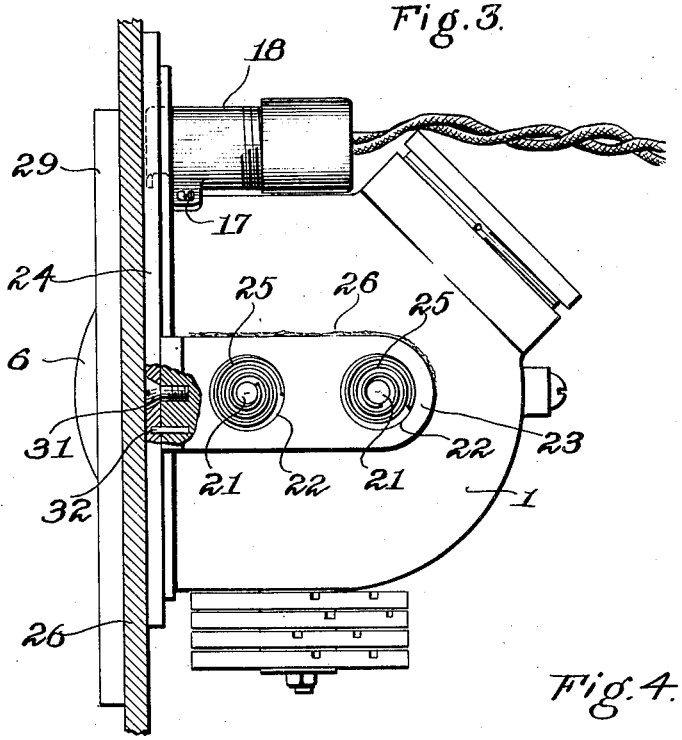
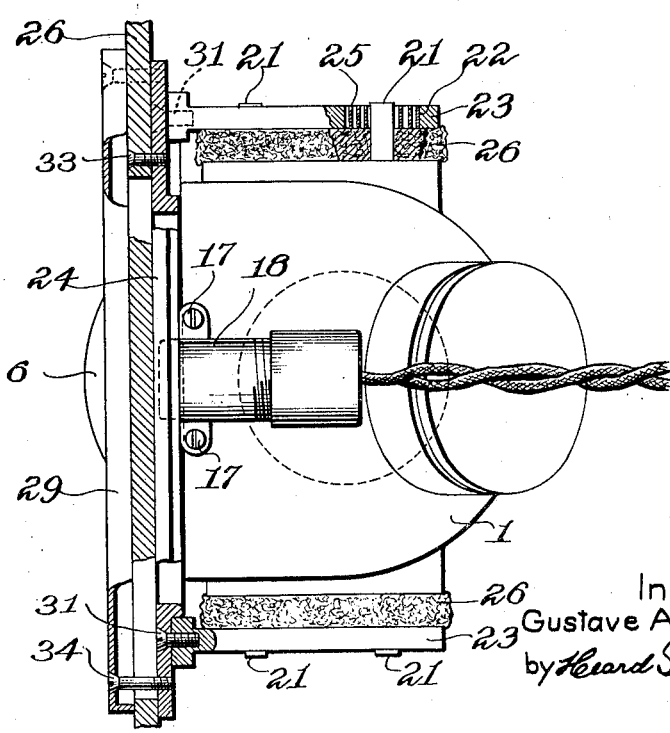

Patented Sept. 18, 1934

1,973,728

UNITED STATES PATENT OFFICE 1,973,728

COMPASS

Gustave A. Salzgeber, Dorchester, Mass.

Application January 3, 1929, Serial No. 330,110
Renewed November 29, 1933

7 Claims. (Cl. 240—2.1)

This invention relates to compasses of the type in which the compass card is enclosed in a casing or compass bowl which is filled with some liquid, such as kerosene, and one of the objects of the invention is to provide improved means for illuminating the compass card at night so that it can be more readily read.

Other objects of the invention are to improve compasses of this type in various features all as will be more fully hereinafter set forth.

In order to give an understanding of the invention I have illustrated in the drawings a selected embodiment thereof which will now be described after which the novel features will be pointed out in the appended claims.

In the drawings, Fig. 1 is a side view of a compass embodying my invention with a part broken out;

Fig. 3 is a side view of the compass;

Fig. 4 is a plan view;

Figure 1:
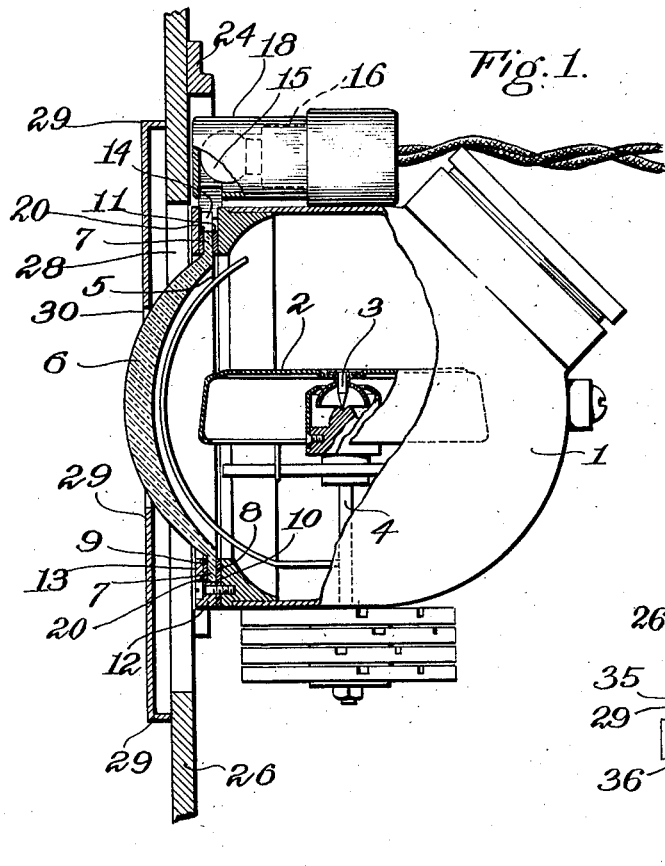

In the drawings 1 indicates the liquid-containing casing or compass bowl within which the compass card is located and 2 is the compass card. This card is shown as provided with a pivot 3 which is mounted on a suitable bearing at the upper end of a post 4, all as usual in compasses of this type.

The compass bowl 1 is provided with the usual sight opening 5 which is closed by a glass closure 6 and through which the compass is read. In the construction shown the glass 6 is concavo-convex in shape and has spherically-curved faces. The curvature of the concavo-convex faces is such that the glass will have magnifying properties, said glass being thicker at the center than at the peripheral portions. The spherically-curved portion of the glass is thus in the nature of a spherical lens. Said glass closure 6 has a marginal or peripheral flange portion 7 which is provided with flat parallel faces 8 and 9, said faces occupying planes at right angles to the axis of the glass. The bowl 1 has the flat face 10 surrounding the sight opening 5 and against which the flat face 8 of the flange 7 bears, there being a gasket or packing 11 between the glass and the face 10.

The glass is held in place by a clamping ring 12 which is screwed to the face 10 and is provided with the annular lip 13 that overlies the face 9 of the glass and bears thereagainst, it being understood that there will be suitable packing 20 between the lip 13 and the face 9 to make a tight joint. As observed from Fig. 1 the peripheral portion of the compass card which bears the readings extends to and slightly beyond the plane of the marginal flange 7 of the glass.

In accordance with my invention the compass card 2 is illuminated by light which is admitted only through the flange 7 of the glass in the direction of the plane thereof. For this purpose the clamping ring 12 is formed with an opening 14 which is situated in the plane of the flange 7 of the glass and a source of illumination is provided for directing the light rays through the opening 14 and edgewise into the flange 7.

Any suitable source of illumination may be provided but the most convenient one is a small electric lamp 15 which is shown as supported in a socket 16 that is secured to the upper side of the bowl by suitable screws 17. The lamp socket 16 may carry a hood portion 18 which covers the lamp on all sides except that which is directed toward the opening 14 and, if desired, the interior of the hood may have a reflecting surface so that the light rays which are transmitted through the opening 14 will be both those directed toward the opening and those reflected into the opening by the reflector. The spherical lens portion of the glass closure 6 has reflecting and refracting qualities by which light rays directed edgewise through the marginal portion 7 of the glass are reflected onto the card. The result of directing the light rays into the interior of the bowl through the flange 7 of the glass of the shape shown, that is, a glass having the concave and convex surfaces, is that a very even illumination of the compass card will result. In fact, the light which passes through the opening 14 appears to be distributed throughout the flange 7 so that the compass gives the appearance of a ring of light around the peripheral edge of the glass 6. The compass card is thus evenly illuminated.

The light is thus introduced into the compass bowl for illuminating the card without forming any separate opening through the bowl for this purpose and also in such a way that the lamp or source of light does not interfere in any way with reading the compass from any angle or obscuring full front view. The tightness of the joint between the glass and the bowl depends upon the clamping action of the lip 13 of the clamping ring 12 and upon the tightness of the gaskets 11 and 20 between the flange 7 and the face 10 of the casing and the lip 13 of the clamping ring respectively. The formation of the opening 14 in the clamping ring does not affect any of these features. Moreover, the provision of the illuminating means does not necessitate the forming of any additional aperture in the bowl for the admission of the light because the light is transmitted through the glass 6, albeit in such a way that no part of the illuminating mechanism interferes with the view of the compass card.

As herein shown said bowl is provided at each side with two laterally-extending projections 21 which occupy openings 22 in bracket arms 23 that are secured to the support 24 by which the compass is carried. Each projection 21 is connected to the arm 23 through the medium of a spiral spring 25. Each spring 25 is arranged to have frictional engagement both with the wall of the opening 22 and with the supporting pin 21. The inner end of each spring 25 fits closely around the pin 21 and the outer end bears against the wall of the opening 22. The compass bowl is thus suspended on the four springs 25.

26 indicates felt pads which are interposed between the sides of the casing and the arms 23. These felt pads cushion the bowl in a transverse or sidewise direction and the projections 21 with the springs 25 yieldingly support the bowl and relieve the latter of vibrations which may be transmitted to the arms. This projection and spring construction allows the bowl to yield or give slightly in a vertical direction and also to rock slightly about a horizontal axis.

The supporting arms 23 are rigid with the frame member 24, said arms being secured to the frame by means of screws 31. 32 indicate steady pins which are anchored in the arms 23 and enter sockets in the frame 24. The frame 24 is mounted on the panel 26, it being herein shown as located on the rear side of the panel and as being secured to the panel by means of screws 33.

On the front of the panel is a removable cover plate 29 which is provided with a sight opening 30 and which forms a finish plate for the instrument. The glass 6 projects partially through the opening 30 and the cover plate overlies and covers the opening 28 in the panel. With this arrangement not only the compass bowl but also the lamp or source of illumination is located in the rear of the panel and there is nothing on the front of the panel except the cover plate 29 and the rounded portion of the glass 6. This flush mounting for the compass is specially desirable on airplanes and similar locations because the compass presents no obstruction or protuberance on which a person could be injured.

Figure 5:
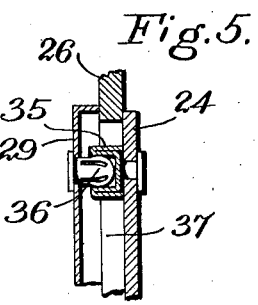
Fig. 5 is a fragmentary sectional view showing a modification of the invention.
Figure 2:
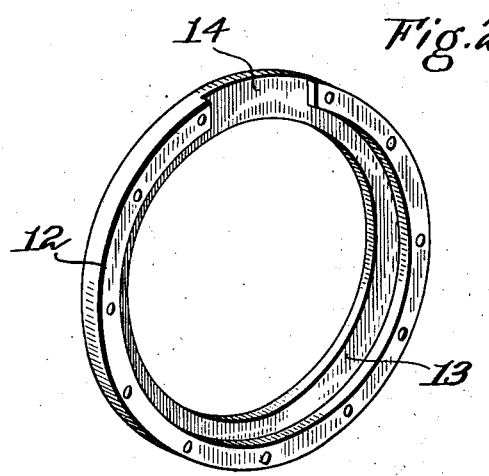
Fig. 2 is a perspective view of the clamping ring for the glass.

The cover plate 29 may be secured in position in any suitable way. In Fig. 4 I have shown it as fastened to the frame 24 by means of screws 34. In Fig. 5 I have illustrated a different embodiment of the invention wherein the cover plate is retained in position by a snap fastening. This is shown as comprising a socket member 35 secured to the frame 24 and a ball member 36 secured to the cover plate 29. When the cover plate is put into position the balls 36 may be snapped into the sockets 35 thus detachably holding the plate.

The panel 26 is formed with suitable openings or spaces 37 to receive the ball and socket fastening.

I claim:

1. In a compass, a compass bowl adapted to be filled with liquid, said bowl comprising a body portion having a sight opening in its side wall, a glass for closing the sight opening, said glass having a concavo-convex body portion and a marginal portion which extends in a plane at right angles to the axis of the sight opening and a clamping ring for clamping the glass to the compass body, which clamping ring has a portion encircling the marginal portion of the glass and a portion overlying said marginal portion, a compass card pivotally mounted within said bowl, an electric light bulb situated to direct light rays into said marginal portion of the glass in a direction parallel to the plane thereof, the encircling portion of the clamping ring being cut away opposite said light.

2. A compass comprising a compass bowl adapted to be filled with liquid, said bowl having a body portion provided with a sight opening, a glass closing said sight opening, said glass having a concavo-convex body portion and a marginal portion which extends in a plane at right angles to the axis of the sight opening, a compass card pivotally mounted in said bowl to turn about an axis parallel to the plane of said marginal portion, said compass card having at its periphery a depending skirt, the portion of said skirt which is adjacent the concavo-convex glass extending beyond the plane of said marginal portion and slightly into the convexity of the glass, and an electric light bulb situated to direct light rays through the marginal portion of the glass in a direction parallel to the plane thereof.

3. A compass comprising a compass bowl adapted to be filled with liquid, said bowl having a body portion provided with a sight opening in its side wall, a glass closing said opening, said glass having a concavo-convex body portion and a marginal portion which extends in a plane at right angles to the axis of the sight opening, a compass card pivotally mounted in said bowl to turn about an axis parallel to the plane of said marginal portion of the glass, said card having a depending peripheral skirt, the portion of the said skirt which is adjacent the concavo-convex glass extending at least to the plane of said marginal portion, and an electric light bulb carried by the casing and situated to direct light rays into the marginal portion of the glass in a direction parallel to the plane thereof, the body portion of the compass bowl shielding the compass card from any light rays projected by said bulb except those which pass through the marginal portion of the glass.

4. A compass comprising a compass bowl adapted to be filled with liquid, said bowl having a sight opening in its side wall, a glass closure for said opening, the central portion of said closure being spherically curved and constituting a spherical lens, and the marginal portion of said closure extending in a plane at right angles to the axis of the sight opening, means co-operating with said marginal portion to clamp the closure to the body of the bowl, a compass card in said bowl, said card having a skirt portion facing the spherical lens portion of the closure, and a source of illumination situated to direct light rays through a portion of said closure in the general direction of the plane thereof, the spherically-curved portion of the closure having refractive and reflective qualities which direct into the compass bowl for illumination of the card light rays which are thus directed through said portion of the closure.

5. A compass having a compass bowl adapted to be filled with liquid and provided with a sight opening, a glass closure for said sight opening, the central portion of said closure being spherically curved and the marginal portion extending in a plane at right angles to the axis of the sight opening, a compass card having a graduated skirt portion facing the spherically-curved portion of the glass and readable therethrough, a source of illumination situated to direct light rays edgewise through the marginal portion, the spherically-curved portion of the glass having refractive and reflective qualities which direct said light rays onto the compass card for the illumination thereof.

6. A compass comprising a compass bowl adapted to be filled with liquid, said bowl having a sight opening in its side wall, a glass closure for said opening, said closure having a central portion in the form of a spherical lens and a marginal portion surrounding the lens portion, means co-operating with said marginal portion to clamp the closure to the body of the bowl, a compass card in said bowl, said card having a graduated portion facing the lens portion of the closure and a source of illumination situated to direct rays through the marginal portion of said closure in the general direction of the plane thereof, the lens portion of the closure having reflective and refractive qualities which direct into the compass bowl for illumination of the graduated portion of said card the light rays which are thus directed through the marginal portion of the closure.

7. A compass comprising a compass bowl adapted to be filled with liquid, said bowl having a sight opening in its side wall, a closure of transparent material for closing said sight opening, said closure having a central lens portion and a marginal portion surrounding the lens portion, a clamping ring for securing the closure to the compass bowl, said ring encircling the marginal portion of the closure and having a portion overlying said marginal portion, a compass card pivotally mounted within the bowl, the reading portion of the card being in a plane of said marginal portion, an electric light bulb situated to direct light rays into said marginal portion of the closure, the encircling portion of the clamping ring being cut away opposite said light.

GUSTAVE A. SALZGEBER.